United States Patent

Huntsinger

[15] 3,680,097
[45] July 25, 1972

[54] ALL DIGITAL DISTANCE MEASURING EQUIPMENT

[72] Inventor: Dean P. Huntsinger, Marion, Iowa

[73] Assignee: Collins Radio Company, Cedar Rapids, Iowa

[22] Filed: Oct. 28, 1969

[21] Appl. No.: 870,026

[52] U.S. Cl. .............................................. 343/7.3
[51] Int. Cl. .............................................. G01s 9/14
[58] Field of Search ........................... 343/5 DP, 7.3

[56] References Cited

UNITED STATES PATENTS

| | | | |
|---|---|---|---|
| 3,354,455 | 11/1967 | Briggs et al. | 343/7.3 |
| 3,473,130 | 10/1969 | Briggs | 343/7.3 X |
| 2,807,015 | 9/1957 | Shank | 343/7.3 |
| 3,320,612 | 5/1967 | Crow et al. | 343/7.3 |

Primary Examiner—Malcolm F. Hubler
Attorney—Robert M. Sperry and R. J. Crawford

[57] ABSTRACT

This invention relates to all-digital distance-measuring radio equipment wherein all time measurements are performed by counting oscillator pulses, and a single counter performs both search and memory functions while yielding directly readable distance values.

10 Claims, 2 Drawing Figures

FIG. I

INVENTOR.
DEAN P. HUNTSINGER
BY Robert M. Sperry
ATTORNEY

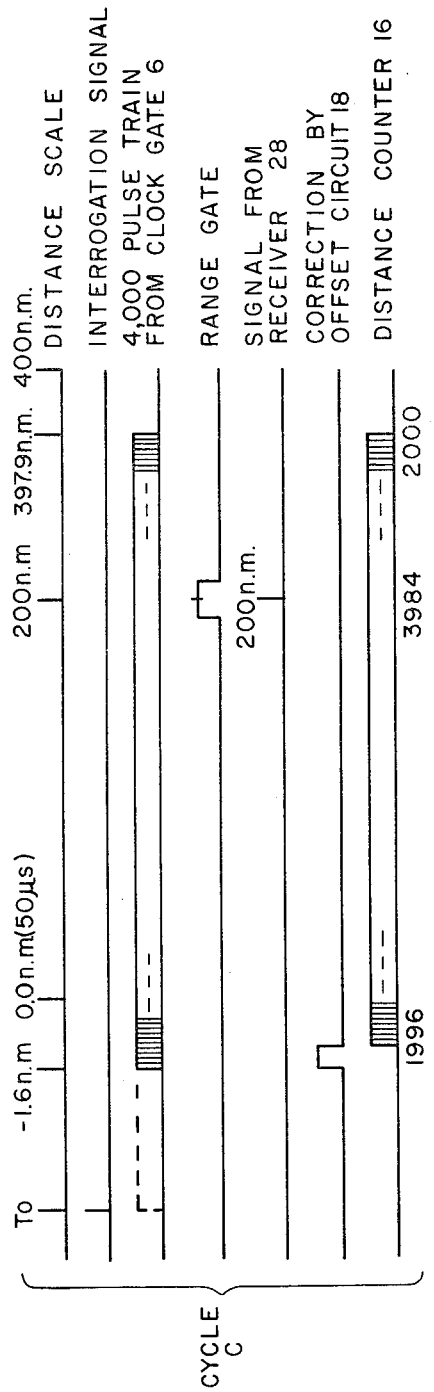

ALL DIGITAL DISTANCE MEASURING EQUIPMENT

This invention relates to distance measuring equipment and is particularly directed to all digital distance measuring radio equipment.

Devices for measuring distance by radio techniques, generally known as "DME systems," have gained wide acceptance in the aviation industry since they provide rapid and accurate determination of distance and, consequently, enhance navigation and air traffic control. Unfortunately, the prior art DME systems have been extremely complex and, hence, have been bulky, heavy and expensive; whereas space and weight are always limited in aircraft, and expense is a matter of concern in any case. Furthermore, most of the prior art DME systems have been electromechanical or have been "quasi-digital;" that is, they have been partially digital, but also have employed monostable multivibrators which, when triggered by a short pulse, generate a longer pulse having a width and amplitude determined by the design of the multivibrator circuit. However, electromechanical components are relatively bulky, slower in operation and less accurate than electronic circuits, and generally do not provide digital outputs. Multivibrator circuits overcome many of the deficiencies of electromechanical systems. On the other hand, time measurements can be made by such circuits to an accuracy of only about 1 per cent, at best. Although this accuracy is sufficient for some purposes, there is increasing demand for DME systems to supply information for fully-automatic aircraft landing systems. This demand imposes extremely high accuracy requirements on the DME systems, which are far beyond the capabilities of multivibrator circuits. Furthermore, this demand couples the need for extreme accuracy with a requirement that the measurements be "updated" virtually instantaneously.

The disadvantages of the prior art are overcome with the present invention and an all-digital DME system is provided which is extremely rapid and highly accurate, yet is relatively simple and economical. Moreover, the DME system of the present invention lends itself to micro-miniaturized circuitry which provides reliability, compactness, and lightness of weight.

The advantages of the present invention are preferably attained by providing an all-digital DME system employing only two counters, one of which is an Up-Down counter that functions in a unique manner to perform the search, track and memory operations, yields direct and immediate readouts, and can be up-dated in a minimum of time.

Accordingly, it is an object of the present invention to provide a DME system which is compact, lightweight and inexpensive.

Another object of the present invention is to provide an improved search technique for DME systems.

An additional object of the present invention is to provide an improved DME search system which insures outbound searching without requiring special gating.

A further object of the present invention is to reduce the complexity of DME systems.

A specific object of the present invention is to provide an improved search technique for DME systems which enables a single counter to accomplish both search and memory functions.

Another specific object of the present invention is to provide an all-digital DME system in which all time measurements are made by counting oscillator pulses and a single Up-Down counter performs both search and memory functions and can be rapidly up-dated during the "track" operation.

These and other objects and features of the present invention will be apparent from the following detailed description taken with reference to the accompanying drawing.

Figure 1:
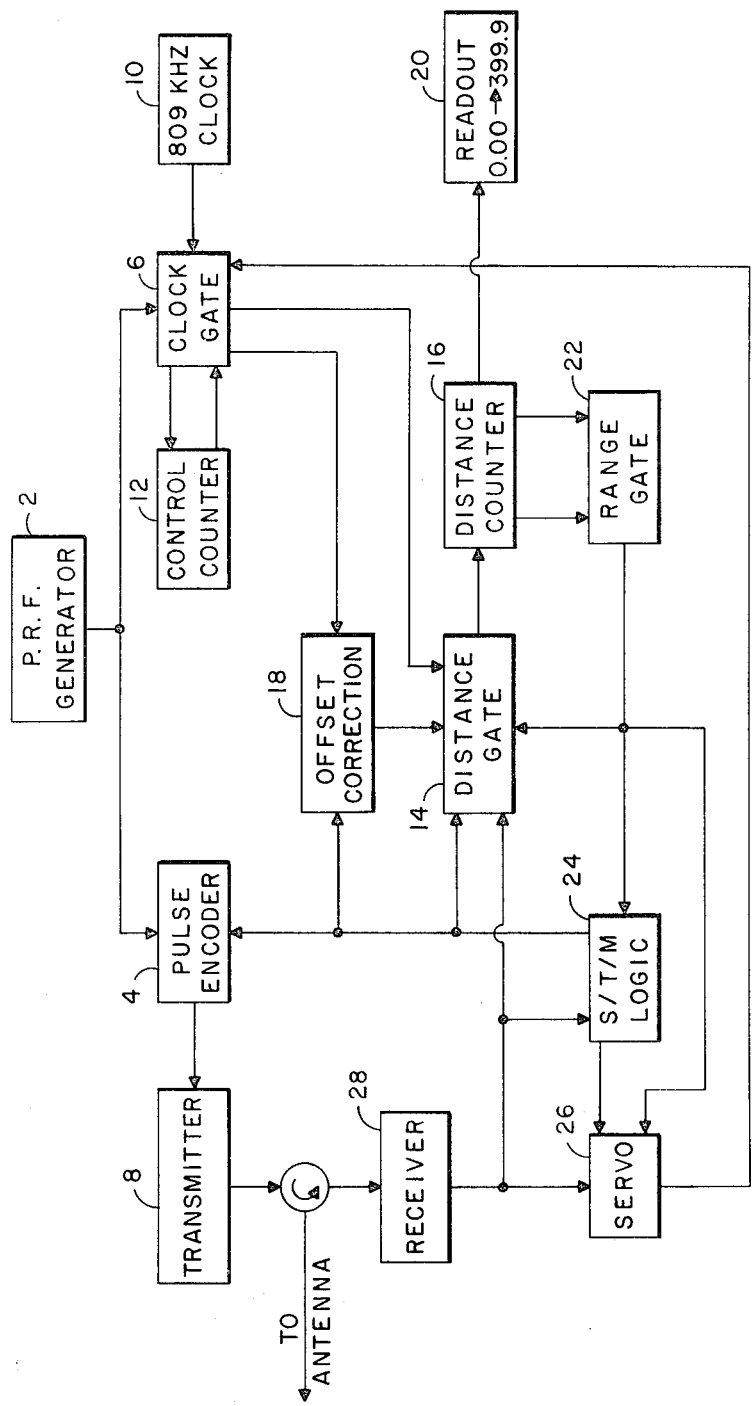
FIG. 1 is a block diagram of a DME system embodying the present invention.

In that form of the present invention chosen for purposes of illustration, FIG. 1 shows a DME system comprising a pulse repetition frequency generator 2 which supplies timing pulses to a pulse encoder 4 and clock gate 6. The pulse encoder 4 supplies a suitably coded signal to transmitter 8 which transmits the coded signal to interrogate a selected VOR/DME station. Simultaneously, P.R.F. generator 2 applies a signal to clock gate 6, thereby allowing pulses from clock circuit 10 to pass to control counter 12. In a typical instance, clock circuit 10 is an oscillator which will provide pulses at a frequency of 809 KHz so that the period between pulses will be equal to the round-trip propagation delay for 0.1 nautical miles. As is well known, DME systems determine distance by measuring the time between emission of an interrogation signal and receipt of a reply signal from the target station. However, the target stations require approximately 50 microseconds between receipt of the interrogation signal and transmission of the reply signal. To account for this, control counter 12 counts an appropriate number of the pulses from clock circuit 10 and, at the conclusion of this predetermined count, applies the check pulse signal to clock gate 6 which causes clock gate 6 to pass a train through distance gate 14 (when enabled) to the distance counter 16 in addition to supplying the clock pulse train to counter 12. Control counter 12 continues to count the pulses applied through gate 6 from clock circuit 10 and provides a signal to close clock gate 6 (as concerns application of clock pulses to counter 12 and distance gate 14) when clock circuit 10 has delivered a number of pulses corresponding to the full count capability of counter 12. The full count capability of counter 12 in turn is defined by the maximum range of the DME system. Thus, if the maximum range of the system is nominally 400 nautical miles, control counter 12 will close clock gate 6 when the clock circuit 10 has passed a train of 4,000 pulses to the control counter 12. Clock gate 6 passes the clock pulses through distance gate 14 offset correction circuit 18 to an appropriate offset correction is effected by circuit 18 during search mode of operation for purposes which will be more fully disclosed hereinafter. The distance counter 16 develops a count indicative of distance to suitable readout means 20 which provides a visual or other desirable indication of the distance. For reasons which will be discussed subsequently, distance counter 16 is preferably an Up-Down counter. When the DME system is operating in the search mode, distance counter 16 functions as a Down counter which counts downward from the maximum range of the system. In addition, at predetermined counts in its counting cycle, distance counter 16 applies signals to "open" and "close" a range gate circuit 22, i.e., logic circuitry in range gate circuit 22 may respond to first and second predetermined counts to "build" a range gate whose edges are defined by the time occurrence of these predetermined counts. Thus, for example, distance counter 16 may be of the type which initially counts downward from the maximum range of the system and may pass a signal to "open" range gate 22 upon reaching a count of 3,988 and may pass a signal to "close" range gate 22 upon reaching a count of 3,980, thus building a range gate eight counts wide centered at a count of 3,984. Range gate circuit 22 applies the range gate pulse simultaneously to distance gate 14, search-track-memory logic circuit 24 and servo 26. Receiver 28 receives signals from the target station and applies these signals to distance gate 14, servo 26 and search-track-memory logic circuit 24. The search-track-memory logic circuit 24 compares the time of arrival of the reply signal from receiver 28 with the range gate from range gate circuitry 22 to determine whether or not a target has been acquired within the time duration of the range gate from range gate circuit 22 and applies signals to pulse encoder 4, offset correction circuit 18, servo 26 and distance gate 14 to cause the system to function in the search mode or track mode, whichever is appropriate as determined by the presence or absence of a reply pulse within the time duration of range gate signals. Servo 26 receives signals from receiver 28, search-track logic circuit 24 and range gate 22 and functions to apply a signal indicative of rate of change of distance to clock gate 6 when the system is operating in the "track" mode.

In operation, pulse generator 2 emits a pulse signal which is encoded by pulse encoder 4 and transmitted by transmitter 8. Simultaneously, the signal from pulse generator 2 serves to open clock gate 6 to pass clock pulses from clock circuit 10 to control counter 12. Control counter 12 counts the number of clock pulses needed to provide the desired time delay (due to the inherent delay in ground station reply signal generation) and, then, applies a signal to cause clock gate 6 to pass the train of clock pulses through distance gate 14, to distance counter 16. Control counter 12 continues to count the pulses emitted by clock circuit 10 and, when the number of pulses in the train corresponds to the maximum range of the system, (for example, 4,000), logic circuitry within clock gate 6 halts the flow of clock pulses as gated through distance gate 14 to distance counter 18. As an example, in a DME system designed to provide 0.1 nautical mile accuracy over ranges up to a maximum of 400 miles, the clock circuit 10 would emit pulses at a frequency of 809 KHz and control counter 12 would allow a train of 4,000 pulses to pass after the initial time delay, before halting the flow of clock pulses. The distance gate 14 regulates the flow of clock pulses to the distance counter 16 in response to signals from offset circuit 18, range gate correction 22, receiver 28 and the circuit search-track-memory logic circuit 24. In the "search" mode, distance gate 14 is initially open and passes the flow of clock pulses to distance counter 16. Upon receipt of a signal from range gate circuit 22, distance gate 14 closes and blocks the train of clock pulses to distance counter 16 until receiver 28 applies a signal to the distance gate 14. In the "track" mode, distance gate 14 remains open and the entire train of pulses from clock circuit 10 as applied through clock gate 6 are passed to the distance counter 16. The signals applied to distance gate 14 by the search-track-memory logic circuit 24 determine the mode in which the distance gate 14 is operating. Distance counter 16 starts with the number corresponding to the maximum range of the system, for example, 4,000, and counts downward as determined by the number of pulses received from clock circuit 10 through clock gate 6 and distance gate 14. As will be seen hereafter, when control counter 12 reaches its full count capability to close clock gate 6 and end the train of pulses from clock circuit 10 as applied to distance gate 14, the distance counter 16 will hold a number indicative of the distance to the target station and this number will, then, be applied to readout means 20 for visual display or the like. This cycle of operation is repeated each time pulse generator 2 applies a pulse to pulse encoder 4 to initiate an interrogation transmission. At the beginning of each interrogation after the initial cycle, distance counter 16 will start counting at the point where it stopped when clock gate 6 was closed to cut off the supply of clock pulses for counter 16 in the preceding cycle and, ideally, would arrive at zero count precisely when a reply signal is received by receiver 28. However, for various reasons, the actual arrival of the subsequent reply signals may occur either slightly before or slightly after this precise time. To compensate for this, range gate 22 generates the leading edge of the range gate at a time corresponding to a selected number of counts before the receipt of a reply signal is expected. The range gate duration is a predetermined number of counts, for example, eight counts, so as to cause the range gate 22 to "straddle" the expected arrival of a reply signal.

Figure 2:
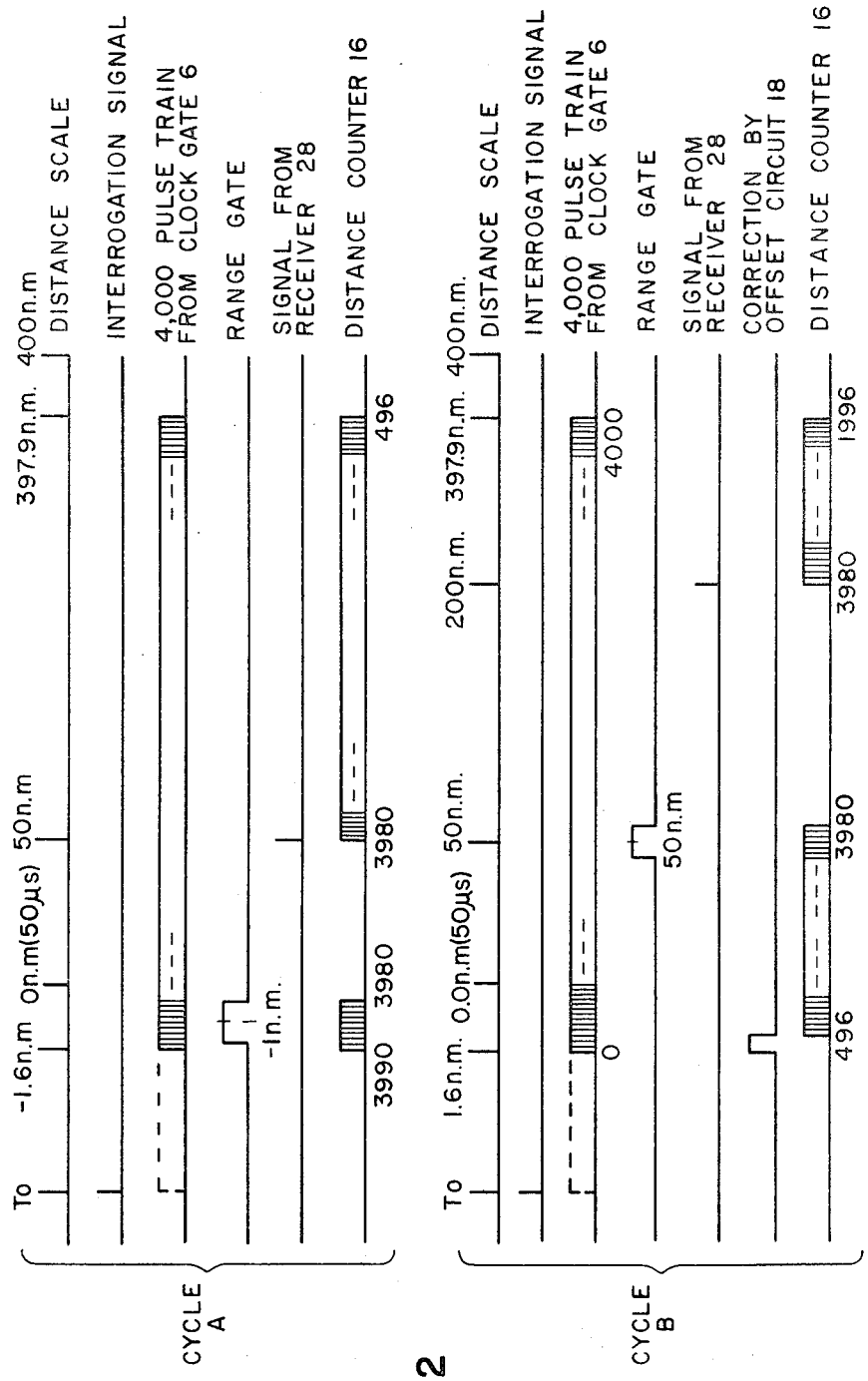
FIG. 2 is a timing chart representing the sequence of operation of the elements of the DME system of FIG. 1 during several cycles of operation.

It is believed that the function of the DME system of the present invention can best be understood by describing, in detail, several successive cycles of the search operation of the system. Accordingly, FIG. 2 shows timing sequences for three successive cycles of operation, indicated respectively in FIG. 2 as Cycles A, B and C. Cycle A occurs when the DME system of FIG. 1 is initially turned "on" and, actually, is prior to the start of the search operation. For convenience, it will be assumed that each interrogation cycle starts with the emission at time $T_o$ of the interrogation pulse by the pulse encoder 4 and simultaneous application of a signal from pulse generator 2 to open clock gate 6 to pass pulses from clock circuit 10 to control counter 12 for measurement of the desired time delay. As indicated above, VOR/DME ground stations require approximately 50 microseconds between receipt of an interrogation signal and emission of a reply signal. It has been pointed out that the reply signals may actually arrive slightly before the expected time. Moreover, it is important to maintain the accuracy of the system in measuring short, as well as long, distances since the DME system may provide input data for a fully-automatic landing system or the like. For these reasons, it is desirable to have the distance counter 16 and range gate 22 operative at time less than 50 microseconds after the start of an interrogation cycle at time $T_o$; despite the fact that this time range corresponds to negative distance values. To accomplish this, control counter 12 may be provided with appropriate logic means to establish a time delay between interrogation pulse transmission and application of clock pulses to the distance counter which is less than 50 microseconds by a selected time interval, such as the interval required to pass 16 pulses from clock circuit 10, corresponding to $-1.6$ nautical miles. With the clock circuit 10 operating at 809 KHz, approximately 20 microseconds are required for this 16 pulse interval. Accordingly, control counter 12 counts 24 clock pulses from time $T_o$, providing a time delay of approximately 30 microseconds, at which time logic circuitry within clock gate 6 may sense this number and cause clock gate 6 to pass the clock pulses to distance gate 14 for application to and distance counter 16 for the distance measurement. This permits the range gate circuit 22 to provide a range gate straddling $-1.0$ nautical miles. To overcome the effects of these negative distances on the distance measurement, it is convenient, as will be seen, to initially pre-set the distance counter 16 to indicate a maximum value of 3,990 rather than the maximum value of 4,000 for a nominal 400 mile range system.

As seen in FIG. 2, Cycle A begins, at time $T_o$, when pulse generator 2 causes the interrogation signal to be transmitted and applies a pulse to open clock gate 6 to pass pulses from clock circuit 10 to control counter 12 for measurement of the desired time delay. As indicated above, control counter 12 counts 24 pulses and, at the conclusion of the 24 pulse count clock gate 6 passes the train of clock pulses through distance gate 14 to distance counter 16. These pulses are counted by control counter 12 and are passed through distance gate 14 to distance counter 16 which proceeds to count downward from the initial preset count of 3,990. At a count of 3,988, logic circuitry in range gate circuit 22 generates the leading edge of a range gate and eight counts (0.8 nautical miles) later generates the trailing edge. The range gate is thus centered at $-1.0$ nautical miles (a count of 3,984 on distance counter 18) and ends at $-0.6$ nautical miles (a count of 3,980 on distance counter 16). The termination of the range gate from range gate circuit 22 disables distance gate 14, thereby blocking further ones of the train of clock pulses from application to distance counter 16. Note, however, that clock gate 6 remains open and control counter 12 continues to count toward its maximum count. Hence, the system is now actually measuring despite the fact that the zero mileage point, that is, the earliest time at which arrival of a reply signal is expected, has not yet been reached. Sometime later, receiver 28 detects a signal, which may be either "squitter" or a time reply signal, and passes this signal to again enable distance gate 14. For convenience, let us assume that the signal was detected at a time corresponding to 500, as indicated in Cycle A of FIG. 2, down from time $T_o$ counts or a distance of 50 nautical miles. When distance gate 14 opens at the reception time of the received signal, distance counter 16 again receives clock pulses and resumes counting at the clock rate downward from 3,980 (the count defining the trailing edge of the range gate). Meanwhile, clock gate 6 has remained open and clock pulses have been counted by control counter 12. When control counter 12 has counted 4,000 pulses (its maximum count capability), logic circuitry in gate 6, halts the flow of pulses from clock circuit 10. This terminates Cycle A. Distance counter 16 had a count of 3,980 when it was previously stopped, six counts (0.6 nautical miles) prior to the zero mileage point, and did not resume counting until 500 counts (50.0 nautical miles) after the zero mileage point. Consequently, distance counter 16 has missed a total of 506 counts and, at the end of Cycle A, distance counter 16 still holds a count of 496, corresponding to 49.6 nautical miles (not the true reading of 500 due to the "negative distance" offset).

Cycle B starts when pulse encoder 4 again causes an interrogation pulse to be transmitted at time $T_0$ and simultaneously applies a pulse to open clock gate 6. Clock gate 6 then begins passing pulses from clock circuit 10 to control counter 12 which again counts 24 pulses toward its full count to provide the desired time delay. At the conclusion of this delay clock gate 6 again provides clock pulses for application to the distance counter. Since this is not the initial cycle, clock gate 6 passes the clock pulses, at the conclusion of the delay to offset correction circuit 18, rather than directly to distance gate 14. The offset correction circuit 18 blocks the first four clock pulses, corresponding to 0.4 nautical miles, and passes the remainder of the newly applied clock pulse train through distance gate 14 to distance counter 16. By blocking the first four pulses of the newly applied clock pulse train, offset correction circuit 18 has, effectively, added 0.4 nautical miles to the distance represented by the count of 496 held by distance counter 16 from the preceding cycle of operation. Upon release by offset correction circuit 18, the train of pulses flows through distance gate 14 to cause distance counter 16 to resume its downward count from the 496 count held at the end of the previous cycle. Since the count held by distance counter 16 at the end of Cycle A, represented 49.6 nautical miles, it will be seen that the additional 0.4 miles provided by the offset correction circuit 18 yields a total of 50.0 nautical miles, which corresponds to the position of the signal detected by receiver 28 during Cycle A. On the other hand, since clock gate 6 was opened to apply clock pulses to distance counter 16 at a point corresponding to −1.6 nautical miles, distance counter 16 will reach zero count at a point corresponding to a distance of 48.4 nautical miles. However, upon reaching zero count, distance counter 16 returns to the its count capability of 4,000 and continues counting downward from that value. Thus, 12 counts later, at a point corresponding to 49.6 nautical miles, distance counter 16 reaches the value of 3,988 in response to which range gate circuit 22 generates the leading edge of the range gate which, is applied to distance gate 14, search-track logic circuit 24, and servo 26 to arm the system for the expected arrival of a reply signal at the range gate center four counts later, corresponding to a distance of 50 nautical miles. It will be seen that distance counter 16 has counted 496 pulses since the beginning of Cycle B and, hence, has opened range gate circuit 2 at a point corresponding to 49.6 nautical miles. Distance counter 16 continues its downward count and, upon reaching zero count, immediately returns to the maximum range of 4,000 value and proceeds counting downward from that value. It will be recalled that, at the start of Cycle A, the maximum range value of distance counter 16 was preset to 3,990. However, upon reaching zero count in Cycle B and in cycles subsequent to the initial Cycle A distance counter 16 counts down to zero and returns to the full value of 4,000 from which it continues counting downward. Let us assume that the signal detected by receiver 28 during Cycle A was a "squitter" and, consequently, will not be repeated during Cycle B. Accordingly, no reply signal will be detected in Cycle B during the eight count width of the range gate and the termination of the range gate closes distance gate 14 and disarms search-track-memory logic circuit 24 and servo 26. Since the range gate was initiated in initial Cycle A at a point corresponding to 49.6 nautical miles and has an eight count width, it will be seen that the range gate terminates at a point corresponding to 50.4 nautical miles. It will also be seen that termination of the range gate closed distance gate 14 and, hence, stopped the flow of clock pulses to distance counter 16 with the distance counter 16 holding a count of 3,980. Let us now assume that receiver 28 detects a signal at a point corresponding to 200 nautical miles as depicted in Cycle B of FIG. 2. Upon receipt of this signal, receiver 28 passes a signal to reopen distance gate 14 which allows the train of clock pulses to again flow to distance counter 16 causing distance counter 16 to resume counting downward from 3,980 until control counter 12 closes clock gate 6 at the end of Cycle B. Since distance counter 16 held a count of 496 at the start of Cycle B and missed 4 counts, due to offset correction circuit 18, and missed 1,496 counts, between the termination of the range gate and detection of the new signal by receiver 28; it will be seen that distance counter 16 holds a count of 1,996 at the end of Cycle B which corresponds to a distance of 199.6 nautical miles.

So long as no actual reply signal is received, the system will remain in the search mode and will continue to operate substantially in the manner described for Cycle B. Thus, at the end of each cycle, distance counter 16 will hold a count corresponding to a distance which is 0.4 nautical miles less than the position at which receiver 28 detected a signal during that subsequent cycle which assures that, in the next cycle, the range gate will be made to straddle the position at which the signal was detected.

Because of the previously discussed necessity for searching at negative distances, the train of pulses from clock gate 6 covers a range of distances from −1.6 to 398.4 nautical miles. However, it is imperative that the range gate be terminated at the beginning and end of each interrogation cycle in order to prevent disruption of the system logic. Hence, since the range gate extends four counts beyond the point of an expected reply, the operative range of the system is restricted to 397.9 nautical miles. Distances greater than 397.9 nautical miles constitute a "forbidden zone" and any time that distance counter 16 completes a cycle with a value corresponding to a distance falling in this "forbidden zone," logic circuitry, in sensing these "forbidden" counts, may automatically preset the counter to a value of 3,990 and the next cycle of operation will be performed as described above for Cycle A. This situation may occur, for example, if receiver 28 should miss a signal for any reason. The provision of the "forbidden zone" thus serves to insure outbound searching.

In Cycle C, of FIG. 2, let us assume that the signal at 200 nautical miles, detected by receiver 28 during Cycle B, was an actual reply signal. Accordingly, Cycle C begins with pulse encoder 4 causing transmitter 8 to send an interrogation signal at the time a signal is applied from PRF generator 2 to open clock gate 6 to pass clock pulses from clock circuit 10 to control counter 12 which measures the desired time delay and, at a time corresponding to −1.6 nautical miles, passes the train of pulses from clock circuit 10 through offset correction circuit 18 and distance gate 14, to distance counter 16. Offset correction circuit 18 withholds the first four clock pulses and, thereafter, passes the train of pulses to cause distance counter 16 to start counting downward from 1,996, the count remaining on distance counter 18 from Cycle B. At a point corresponding to 199.6 nautical miles, distance counter 16 initiates the range gate as applied to distance gate 14, search-track-memory logic circuits 24, and servo 26 to arm the system for the expected arrival of a reply signal. Thus far, the operation is substantially identical with Cycle B and distance counter 16 continues to count downward. This time, however, as distance counter 16 reaches the center range gate count of 3,984, receiver 28 again detects a signal at 200 nautical miles and passes the detected signal to servo 26, search-track-memory logic circuit 24, and distance gate 14. The search-track-memory logic circuit 24 may include logic circuitry which determines that this signal from receiver 28 has arrived during the time period of the range gate and, consequently, represents an actual reply. Therefore, search-track-memory logic circuit 24 applies a signal to distance gate 14 which holds the distance gate 14 open and allows the train of clock pulses to continue to flow to the distance counter 16. Upon reaching zero count, distance counter 16 returns to the maximum count capability of 4,000 and continues counting downward until control counter 12 closes clock gate 6 at the end of the interrogation cycle. Now, at the end of Cycle C, distance counter 16 holds a count of 2,000, since it started Cycle C with a count of 1,996 and gained four counts due to offset correction circuit 18. Since search-track logic circuit 24 has determined that the signal detected receiver 28 during Cycle C is an actual reply (repeatedly present in the range gate time span), the search-track-memory logic circuit 24 may, through appropriate logic circuitry, switch the system to operate in the "track" mode, whereupon, distance gate 14 causes distance counter 16 to apply a signal, indicating the value of the stored count, to readout means 20 for visual display or the like. It should be noted that the count of 2,000 held by distance counter 16 at this point, corresponds directly with the distance of 200 nautical miles; the point at which the actual reply was detected. Consequently, this value can be applied directly to readout means 20 for immediate display without requiring additional time or circuitry for conversion.

In the "track" mode, the system operates in substantially the same manner as described above for Cycle C of the search operation. However, since distance counter 16 held a count of 2,000 at the end of Cycle C, which correctly corresponds to the distance of 200 nautical miles at which the reply was detected, the four count correction of off-set correction circuit 18 is not needed. Accordingly, when the system switches to the "track" mode, the search-track-memory logic circuit 24 may apply a signal to disable the clock pulse inhibiting function of the offset correction circuit 18 to permit all clock pulses supplied to the offset correction circuit 18 to be passed immediately to distance gate 14. As indicated above, servo 26 receives signals from receiver 28, search-track-memory logic circuit 24 and range gate 22 and functions to apply a signal indicative of rate of change of distance to clock gate 6 at the end of each interrogation cycle of "track" operation. The signal from servo 26 serves to shift the position of the range gate as a function of the closure rate between interrogation signal source and ground station transponder so as to maintain the range gate centered on the reply signal despite relative movement between the airplane and the target station. This is accomplished by causing the clock gate 6 to remain open after the end of each interrogation cycle to pass an appropriate number of clock pulses from clock circuit 10 through distance gate 14 to distance counter 16 to cause the desired displacement of the range gate, together with an indication of whether these extra pulses are to be added or subtracted. As indicated above, distance counter 16 is preferably an Up-Down counter. Consequently the desired shifting of the range gate is accomplished as rapidly as the extra clock pulses are received by distance counter 16.

It will be apparent that the offset circuit 18 equally would be effective if it were made to block the last four pulses from clock gate 6, instead of the first four. Alternatively, since distance counter 16 is an Up-Down counter, the offset correction might be realized by causing clock gate 6 to pass four additional clock pulses to distance counter 16 at the end of each search cycle, together with an indication that these pulses are to be added to the count (counter change to "up" mode) held by distance counter 16 at the end of the cycle. Moreover, the eight count width of the range gate, the starting point of −1.6 nautical miles, and the length of the "forbidden zone" are clearly matters of choice. Moreover, numerous variations and modifications may be made without departing from the present invention. Accordingly, it should be clearly understood that the form of the present invention described above and shown in the accompanying drawing is illustrative only and is not intended to limit the scope of the invention.

What is claimed is:

1. An all-digital DME system comprising:
   a pulse generator,
   transmitter means connected to receive pulses from said pulse generator and responsive thereto to transmit an interrogation signal,
   a clock oscillator,
   a control counter operative to generate a first signal upon completion of a first train of clock pulses defining a predetermined time interval and to generate a second signal upon completion of a second train of clock pulses corresponding to the maximum range of said system,
   distance gate means operable to pass said clock pulses,
   clock gate means connected to receive pulses from said pulse generator and said first and second signals from said control counter and responsive to pulses from said pulse generator to pass clock pulses from said clock oscillator to said control counter and responsive to said first signal from said control counter to pass said clock pulses to said distance gate and upon receipt of said second signal to discontinue passage of said clock pulses to said control counter and said distance gate,
   range gate means operable to pass a range gate signal to said distance gate means and to cause said distance gate to halt passage of said clock pulses upon discontinuance of said range gate signal,
   distance counter means connected to receive said clock pulses from said distance gate means and operative upon reaching a first predetermined count to cause said range gate means to initiate said range gate signal and operative upon reaching a second predetermined count to cause said range gate means to discontinue said range gate signal,
   receiver means for receiving reply signals and responsive thereto to pass a signal to said distance gate to cause said distance gate to pass said clock pulses to said distance counter, and
   logic circuit means connected to receive said range gate signal and said reply signal and operative upon receipt of said reply signal during receipt of said range gate signal to pass a signal to said distance gate to cause said distance gate means to continue to pass said clock pulses to said distance counter following discontinuance of said range gate signal.

2. The apparatus of claim 1 wherein:
said clock oscillator emits clock pulses spaced in time intervals corresponding to the travel time of radio signals over a predetermined distance.

3. The apparatus of claim 1 wherein:
said clock oscillator emits clock pulses at a frequency of 809 KHz.

4. The apparatus of claim 1 wherein:
said predetermined time interval defined by said first series of clock pulses counted by said control counter is slightly less than 50 microseconds.

5. The apparatus of claim 1 wherein:
said control counter generates said first signal upon counting 24 clock pulses in said first train.

6. The apparatus of claim 1 further comprising:
readout means, and
means included in said distance gate and responsive to receipt by said distance gate of said signal from said logic circuit means to cause said distance counter upon completion of the cycle of operation to apply to said readout means a signal indicative of the count held by said distance counter.

7. The apparatus of claim 1 further comprising:
offset circuit means interposed between said clock gate and said distance gate operative during the second and subsequent cycles of search mode operation of said system to block passage of a predetermined number of clock pulses from said clock gate to said distance gate.

8. The apparatus of claim 7 wherein:
said predetermined number of clock pulses is equal to one-half of the width of the range gate signal.

9. The apparatus of claim 7 wherein:
said predetermined number of clock pulses is four.

10. The apparatus of claim 1 wherein:
said distance counter is an Up-Down counter.

* * * * *